United States Patent [19]

Hirayama et al.

[11] 4,162,302

[45] Jul. 24, 1979

[54] DECOMPOSITION OF WATER

[75] Inventors: Chikara Hirayama, Franklin Borough, Pa.; Lee E. Brecher, Lexington, Ky.

[73] Assignee: Westinghouse Electric Corp., Pittsburgh, Pa.

[21] Appl. No.: 906,498

[22] Filed: May 16, 1978

[51] Int. Cl.$^2$ .......................... C01B 1/02; C01B 13/02
[52] U.S. Cl. ................................ 423/579; 423/561 R; 423/648 R
[58] Field of Search ................ 423/579, 561 R, 648 R

[56] References Cited

U.S. PATENT DOCUMENTS

| | | | |
|---|---|---|---|
| 1,693,244 | 11/1928 | McDowell et al. | 423/648 R |
| 2,979,384 | 4/1961 | Weiner et al. | 423/648 R |
| 3,969,495 | 7/1976 | Dreyfuss | 423/648 R |
| 3,995,012 | 11/1976 | Barnert et al. | 423/579 |

*Primary Examiner*—O. R. Vertiz
*Assistant Examiner*—Wayne A. Langel

*Attorney, Agent, or Firm*—R. D. Fuerle

[57] ABSTRACT

Water is decomposed into hydrogen and oxygen in a series of steps. In the first step hydrogen sulfide is reacted with cuprous sulfide to produce the hydrogen and cuprous sulfide. The cupric sulfide is then decomposed to produce sulfur and to regenerate the cupric sulfide. The sulfur is reacted with water to produce the hydrogen sulfide and sulfur dioxide. The sulfur dioxide is reacted with water to produce sulfuric acid. The sulfuric acid is decomposed to produce the sulfur dioxide, oxygen, and water.

The decomposition of the sulfuric acid can be performed in four steps. In the first step the sulfuric acid is reacted with a metallic oxide to produce a solution of a metallic sulfate. The hydrate of the metallic sulfate is crystallized from the solution and is decomposed into the metallic sulfate and water. The metallic sulfate is decomposed into the metallic oxide, oxygen, and the sulfur dioxide.

19 Claims, 1 Drawing Figure

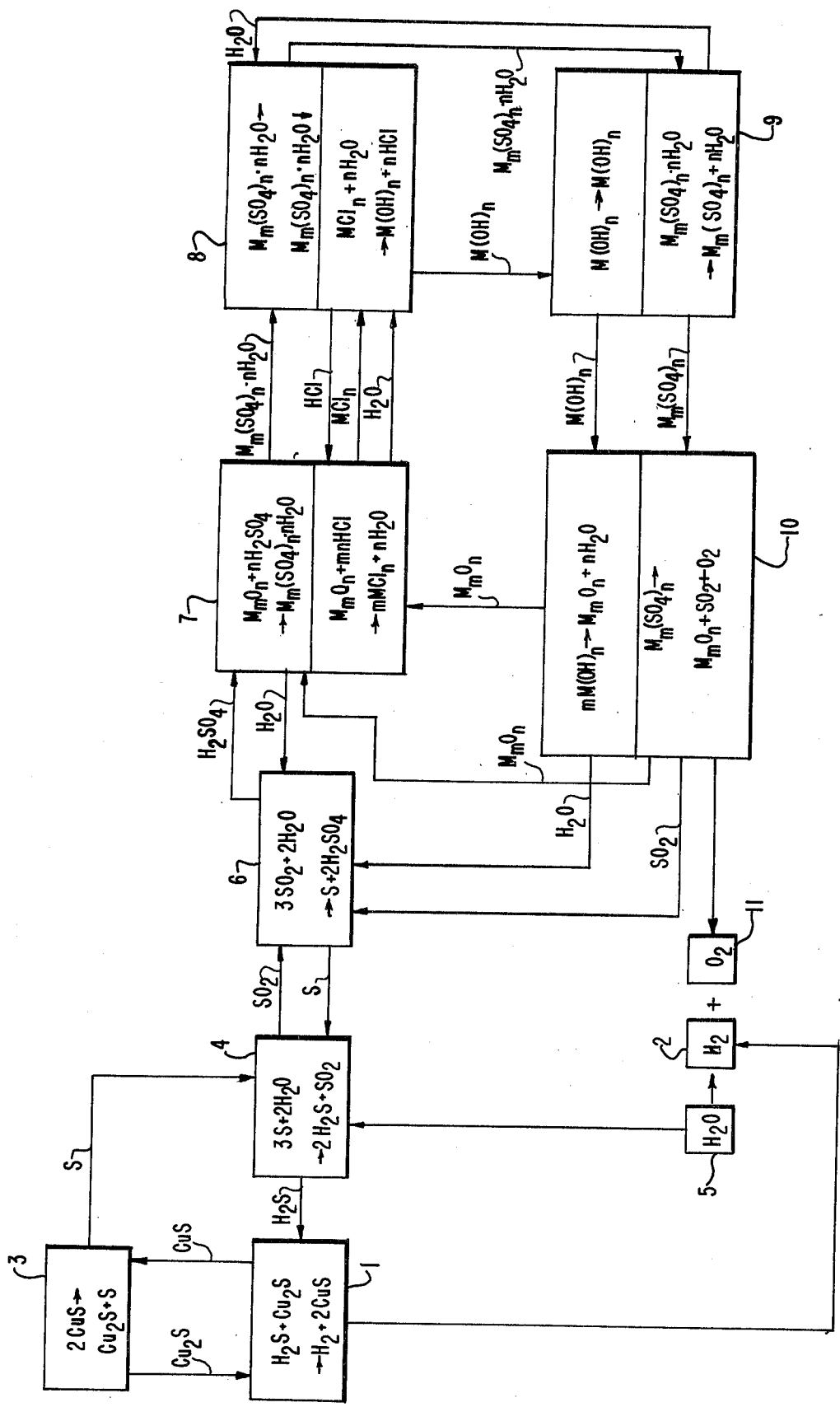

DECOMPOSITION OF WATER

BACKGROUND OF THE INVENTION

As the use of nuclear power plants increases, methods of utilizing or storing the energy generated during off-hours are being studied. Conventional power plants, too, can be operated more efficiently if production is uniform, with the energy generated during off-hours being stored for use during peak hours.

One solution to this problem is to use the heat or electricity to decompose water into hydrogen and oxygen. The oxygen can be sold for other uses and the hydrogen can be stored and burned or used in the production of synthetic fuels.

The thermal (i.e., non-electrolytic) processes for decomposing water have many difficulties associated with them which have until now made them unacceptable for commercial operations. Many of the processes requires temperatures too high to be obtained in generating plants. Others have such low thermal efficiency that their cost exceeds the benefit they provide. Some processes involve the use of difficult-to-obtain or expensive, toxic, or corrosive materials which make them impractical.

SUMMARY OF THE INVENTION

We have discovered a thermal process for decomposing water into hydrogen and oxygen which utilizes lower temperatures than prior thermal processes. Our process is also more thermally efficient than prior thermal processes. Inexpensive, non-toxic, non-corrosive materials are used in the process of this invention.

DESCRIPTION OF THE INVENTION

The accompanying drawing is a block diagram illustrating a certain presently preferred embodiment of this invention.

In the drawing, in block 1 hydrogen sulfide is reacted with cuprous sulfide to produce hydrogen and cupric sulfide. This reaction can be performed from about 150° C. to about 250° C. Below about 150° C. the reaction proceeds too slowly and above 250° C. a large excess of hydrogen sulfide is needed. About 175° to about 225° C. is the preferred temperature range.

Since the hydrogen produced is a gas it is easily separated from the cupric sulfide. The hydrogen is the product (block 2) and the cupric sulfide passes to block 3.

In block 3 the cupric sulfide is decomposed into cuprous sulfide and sulfur. This is a known reaction which can be performed at about 500° to about 950° C. Below about 500° C. the yield is poor and above about 950° C. the reaction proceeds but it is difficult to find such high temperatures available commercially as a result of other processes and it is not economical to generate such high temperatures just for this reaction. About 700° to about 800° C. is the preferred temperature range. Since the sulfur produced is a gas it is easily separated from the solid cuprous sulfide. The cuprous sulfide is recycled to block 1 and the sulfur gas is sent to block 4.

In block 4 the water starting material (block 5) is reacted with sulfur to produce hydrogen sulfide and sulfur dioxide. This is the reverse of the Claus process and reaction conditions are well known. See Gmelin, "Handbuch der Anorganisthen Chemie," 9, part A, page 243. This reaction proceeds at about 175° to about 350° C. At temperatures less than about 175° C. reaction rate is slow and at temperatures above about 350° C. the equilibrium favors the reverse reaction. The preferred temperature range is about 225° to about 275° C. In this reaction the amount of water should be about 50 mole % in excess of stoichiometric as lesser amounts of water result in a poor yield. However, the amount of water should not exceed about 400 mole % in excess of stoichiometric as greater amounts make it difficult to separate the excess water from the sulfur dioxide because sulfuric acid is formed. The sulfur dioxide is preferably separated from the hydrogen sulfide by cooling to about −20° C. to liquefy the sulfur dioxide and remove it from the gaseous hydrogen sulfide. Separation can also be achieved by absorption of the sulfur dioxide on sodium sulfite, later releasing it with heat. The hydrogen sulfide formed is recycled to block 1 and the sulfur dioxide formed is sent to block 6.

In block 6 sulfur dioxide is reacted with water to produce sulfur and sulfuric acid. This reaction has been verified in the literature. See J. W. Mellor, "Comprehensive Treatise on Inorganic and Theoretical Chemistry," (1930). This reaction can be performed at about 0° to about 200° C. Below about 0° C. the reaction is slow and above about 200° C. the equilibrium shifts to the reverse reaction. A preferred temperature range is about 125° to about 175° C. The amount of water used should be at least about 50 mole % in excess of stoichiometric as if less water is used the yield is poor. The amount of water used should not exceed about 400 mole % in excess of stoichiometric, however, as greater amounts make it difficult to separate the excess water and necessitate a lower throughput or a larger reactor. The sulfur formed is a solid which can be filtered and recycled to block 4. The sulfuric acid is sent to block 7.

The next reaction is the decomposition of the sulfuric acid into the oxygen product, sulfur dioxide (returned to block 6), and water (also returned to block 6) according to the equation $H_2SO_4 \rightarrow O_2 + SO_2 + H_2O$. This reaction may be performed directly at temperatures in excess of 750° C. in the presence of a platinum or vanadium pentoxide catalyst. See application Ser. No. 661,071, filed Feb. 25, 1976, herein incorporated by reference, for details. However, the reaction is preferably performed in a series of four steps as lower temperatures are used and the reaction proceeds more readily. The following is a description of the preferred process for decomposing sulfuric acid into oxygen, water, and sulfur dioxide.

In block 7 a metallic oxide is reacted with sulfuric acid to produce a hydrated metallic sulfate according to the known reaction $M_mO_n + nH_2SO_4 \rightarrow M_m(SO_4)_n \cdot nH_2O$. In this and subsequent reactions M can be any oxide of iron, cobalt, nickel, vanadium, or manganese which is soluble in sulfuric acid; the more soluble oxides are preferred. THe most preferred oxide is $Fe_2O_3$ because it is very soluble in sulfuric acid, is inexpensive and readily available, and the $FeSO_4$ which is formed decomposes readily. Other suitable oxides include FeO, $Fe_3O_4$, $V_2O_5$, CoO, NiO, and MnO. The values of m and n depend upon the particular oxide selected, but generally n is an integer from 1 to 5 and m is an integer from 1 to 3. This reaction may be performed at room temperature (or lower) up to about 300° C. At less than room temperature cooling is required which is expensive and the reaction rate is decreased. At temperatures over about 300° C. it is too expensive to obtain the high pressures needed. A preferred temperature range is about 175° to about 200° C. because over about 200° C.

a pressurized reaction vessel is required. The amount of sulfuric acid in this reaction should be about 50 to about 200 mole % in excess of stoichiometric because at less than about 50 mole % excess it is difficult to dissolve all of the metallic oxide and at more than about 200 mole % excess excessive energy is required to crystallize the metallic sulfate hydrate in the subsequent reaction. About 50 to about 100 mole % excess sulfuric acid is preferred. The evaporated water can be recycled to block 6 and the solution of hydrated metallic sulfate is sent to block 8.

Also in block 7, the solubility of the metallic oxide in the sulfuric acid can be increased for some metallic oxides (such as $Fe_2O_3$) if up to about 5% (by weight based on the metallic oxide) of hydrochloric acid is included in the same reaction charge. If more than about 6% is used the metallic chloride (e.g., $FeCl_3$) may interfere in the reactions. The metallic chloride and the water formed in the reaction are also sent to block 8 with the solution of metallic sulfate.

In block 8 the metallic sulfate hydrate is concentrated by evaporation of water which precipitates the metallic sulfate hydrate, a known reaction. This reaction can be performed at about 50° to about 150° C. Below about 50° C. the reaction is slow and at more than about 150° C. excessive thermal energy is used and splattering may occur. A preferred temperature range is about 75° to about 125° C. The reaction is preferably performed under vacuum to draw off excess water. The hydrate product is sent to block 9. Also in block 8 in the same reaction charge the metallic chloride reacts with water to form the metallic hydroxide and hydrogen chloride. The hydrogen chloride is separated as a gas and is returned to block 7. The metallic hydroxide goes to block 9 where it does not react, then to block 10.

In block 9 the metallic sulfate hydrate is decomposed into the metallic sulfate and water, a known reaction. This reaction may be performed at about 85° to about 400° C. At less than about 85° C. the water is not driven off and temperatures over about 400° C. are unnecessary and may decompose the sulfate. About 100° to about 200° C. is a preferred temperature range. The water evaporated may be returned to block 8 and the metallic sulfate is sent to block 10.

In block 10 the metallic sulfate is decomposed into the metallic oxide, the oxygen product, and sulfur dioxide, a known reaction. This reaction can be performed at about 500° to about 700° C. At temperatures less than about 500° C. the reaction is slow and temperatures over about 700° C. are unnecessary. A temperature range of about 600° to about 700° C. is preferred. The oxygen may be separated from the sulfur dioxide by condensing the sulfur dioxide. The oxygen is the product (block 11), the sulfur dioxide is returned to block 6, and the metallic oxide is returned to block 7. Also in block 10 in the same reaction vessel, the metallic hydroxide is decomposed into the metallic oxide and water. The metallic oxide is returned to block 7 and the water may be returned to block 6.

In principle, the net input of the process of this invention is water and the net output is hydrogen and oxygen. All other chemicals used are regenerated. In practice, however, it may be desirable not to return all of the water produced in various reactions to the reactions indicated since the water may contain contaminants or other sources of water may be more convenient. The replenishment of various compounds used in the reactions may be required from time to time to make up for losses resulting from spills or contamination. The apparatus necessary for carrying out the reactions of the invention are known and within the skill of the art of chemical engineering.

The thermodynamic efficiency for the water-splitting cycle disclosed herein is approximately fifty percent. The reaction which requires the highest temperature (see block 3) is within the temperatures available from a high-temperature gas-cooled nuclear reactor.

The following examples further illustrate this invention.

EXAMPLE 1

Three experiments were performed to determine the conversion of cuprous sulfide to cupric sulfide at 200° C. at different proportions of cuprous sulfide to hydrogen sulfide. The following table gives the results.

| Starting Charge, % by weight | % Conversion to CuS After | |
|---|---|---|
| | 1 hour | 3 hours |
| 86.7% $Cu_2S$ - 13.3% $H_2S$ | 32 | 100 |
| 78.9% $Cu_2S$ - 21.1% $H_2S$ | 14.5 | 56 |
| 53.3% $Cu_2S$ - 46.7% $H_2S$ | 7 | 36 |

The above table shows that the rate of reaction is strongly dependent on the $Cu_2S$ content of the starting material. The data also shows that the reaction rates are adaptable to a practical, large scale process.

EXAMPLE 2

Cuprous sulfide and sulfur (gas) were prepared by the thermal decomposition of reagent CuS, in an argon atmosphere. The decomposition time was approximately five hours. The following table shows the composition of the product as a function of temperature.

| Decomposition Temp., °C. | Product of Composition | |
|---|---|---|
| | % CuS | % $Cu_2S$ |
| 600 | 46.7 | 53.3 |
| 800 | 21.1 | 78.9 |
| 875 | 13.3 | 86.7 |

EXAMPLE 3

The effectiveness of the ferric oxide process (blocks 7 to 10) for decomposing sulfuric acid arises from the phase diagram for the system $Fe_2O_3$—$SO_3$—$H_2O$ (as described by Posnjak and Merwin, J. Am. Chem. Soc. 44, 1965 (1922)). The following table shows the maximum concentration of $Fe_2O_3$ in the liquid phase as a function of temperature for this system.

| Temp., °C. | Wt. % in Liquid | | |
|---|---|---|---|
| | $Fe_2O_3$ | $SO_3$ | $H_2O$ |
| 75 | 20.93 | 30.11 | 48.96 |
| 110 | 19.74 | 30.80 | 49.46 |
| 140 | 15.35 | 30.88 | 53.77 |
| 200 | 2.59 | 33.14 | 64.27 |

The following table shows the $Fe_2O_3$ concentration in the liquid phase as a function of $SO_3$ concentration at 75° C.

| Solution | Wt. % | | |
| --- | --- | --- | --- |
| No. | Fe$_2$O$_3$ | SO$_3$ | H$_2$O |
| 1 | 0.34 | 1.00 | 98.66 |
| 2 | 1.72 | 2.79 | 94.49 |
| 3 | 5.54 | 8.88 | 85.57 |
| 4 | 11.23 | 17.73 | 71.04 |
| 5 | 17.78 | 23.10 | 59.12 |
| 6 | 20.93 | 30.11 | 48.96 |
| 7 | 18.13 | 32.32 | 49.55 |
| 8 | 4.59 | 35.51 | 59.90 |
| 9 | 0.71 | 38.68 | 60.61 |

Above 1.72% Fe$_2$O$_3$, in the above table, the solid phase in equilibrium with the liquid consists of various compositions of ferric sulfate where the Fe$_2$O$_3$:SO$_3$:H$_2$O ratio is a function of the liquid phase composition. It is significant to note that the Fe$_2$O$_3$ concentration at 75° C. decreases rapidly from 20.93% to 0.71% as the SO$_3$ concentration increases from 30.11 to 38.68%. It is also important to note in the previous table that the solubility of Fe$_2$O$_3$ in the sulfuric acid decreases markedly as the temperature increases from 75° to 200° C. The sulfuric acid decomposition process, therefore, would be to adjust the SO$_3$ to H$_2$O ratio approximately to that shown for Sample 6 in the above table, then to dissolve Fe$_2$O$_3$ into the acid solution until the composition of the liquid is near that of Sample 6. The temperature of the solution is then raised to 175°-200° C., whereupon the bulk of the iron will crystallize as ferric sulfate hydrate. The solid hydrate is then easily separated from the liquid for processing. The liquid phase is recycled to the iron oxide dissolution step.

The dissolution rate of Fe$_2$O$_3$ in sulfuric acid is relatively slow, but it is significantly enhanced by adding a small amount of hydrochloric acid to the system. The crystal phase which separates from this system is still the hydrated ferric sulfate.

EXAMPLE 4

Fifty gram mixtures were prepared in 100 ml test tubes with the compositions shown in the following Table.

| | Sample No. | | | |
| --- | --- | --- | --- | --- |
| Wt. % | 1 | 2 | 3 | 4 |
| Fe$_2$O$_3$ | 20.7 | 20.7 | 20.7 | 20.7 |
| SO$_3$ | 30.7 | 30.7 | 30.7 | 30.7 |
| HCl | 0 | 2 | 4 | 6 |
| H$_2$O | 48.6 | 46.6 | 44.6 | 42.6 |

The test tubes containing the mixture were placed in an oil bath at 75° C. and the mixtures were continuously agitated. Samples were taken from each tube at one-hour intervals to determine the amount of iron which had dissolved. The addition of HCl to the mixture significantly increased the dissolution rate of Fe$_2$O$_3$.

EXAMPLE 5

A mixture containing 20.7% Fe$_2$O$_3$, 30.7% SO$_3$, 13.8% HCl, and 34.8% H$_2$O was made and stirred at 75° C. After three hours the Fe$_2$O$_3$ was completely dissolved. Upon heating this solution to approximately 175° C. crystals of hydrated ferric sulfate separated from the solution in large quantities. Also, when a similar solution at 75° C. was cooled to room temperature there was massive separation of Fe$_2$(SO$_4$)$_3$.8H$_2$O. The latter solid was ascertained by chemical and x-ray analyses of the crystalline material. When this solid was heated in a stream of helium, it decomposed in several steps, as shown by a thermogravimetric analysis spectrum. The salt is completely dehydrated at approximately 420° C., and the Fe$_2$(SO$_4$)$_3$ is completely decomposed to Fe$_2$O$_3$ and SO$_3$ at approximately 630° C.

EXAMPLE 6

A sample of anhydrous Fe$_2$(SO$_4$)$_3$ was placed in a silica tube and heated in a stream of helium at 700° C. The product gas analysis after a few minutes of heating showed approximately ninety percent dissociation into SO$_2$ and O$_2$. The solid was Fe$_2$O$_3$. This reaction showed that the SO$_3$, formed initially by dissociation of the Fe$_2$(SO$_4$)$_3$, rapidly reached equilibrium for the reaction SO$_3 \rightleftarrows$ SO$_3$ + ½ O$_2$ in the presence of Fe$_2$O$_3$.

We claim:

1. A process for decomposing water into hydrogen and oxygen comprising
   (1) reacting hydrogen sulfide with cuprous sulfide to produce said hydrogen and cupric sulfide according to the equation H$_2$S + Cu$_2$S → H$_2$ + 2CuS;
   (2) decomposing said cupric sulfide to produce said cuprous sulfide and sulfur according to the equation 2CuS → Cu$_2$S + S;
   (3) reacting said sulfur with water to produce said hydrogen sulfide and sulfur dioxide according to the equation 3S + 2H$_2$O → 2H$_2$S + SO$_2$;
   (4) reacting said sulfur dioxide with water to produce sulfur and sulfuric acid according to the equation 3SO$_2$ + 2H$_2$O → S + 2H$_2$SO$_4$; and
   (5) decomposing said sulfuric acid to produce said sulfur dioxide, water, and said oxygen according to the equation 2H$_2$SO$_4$ → 2SO$_2$ + O$_2$ + 2H$_2$O.

2. A process according to claim 1 wherein step (5) comprises the reaction steps of
   (A) reacting said sulfuric acid with a metallic oxide to produce a solution of a metallic sulfate hydrate in water according to the equation

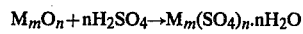
   $$M_mO_n + nH_2SO_4 \rightarrow M_m(SO_4)_n \cdot nH_2O$$

where M is Fe, Mn, Ni, Co, or V, and where m and n depend on the metallic oxide used;
   (B) precipitating the said metallic sulfate hydrate according to the equation

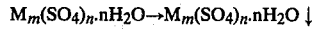
   $$M_m(SO_4)_n \cdot nH_2O \rightarrow M_m(SO_4)_n \cdot nH_2O \downarrow$$

(C) decomposing said metallic sulfate hydrate into insoluble crystalline metallic sulfate and water according to the equation

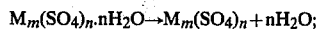
   $$M_m(SO_4)_n \cdot nH_2O \rightarrow M_m(SO_4)_n + nH_2O;$$

(D) decomposing said crystalline metallic sulfate into said metallic oxide, oxygen, and said sulfur dioxide according to the equation

   $$2M_m(SO_4)_n \rightarrow 2M_mO_n + 2nSO_2 + O_2.$$

3. A process according to claim 2 wherein in step (A) the amount of sulfuric acid is about 50 to about 200% by weight in excess of stoichiometric.

4. A process according to claim 3 wherein the amount of sulfuric acid is about 50 to about 100% by weight in excess of stoichiometric.

5. A process according to claim 2 wherein step (A) is performed at room temperature to about 300° C., step (B) is performed at about 50° C. to about 150° C., step (C) is performed at about 85° C. to about 400° C., and step (D) is performed at about 500° to about 700° C.

6. A process according to claim 5 wherein step (A) is performed at about 175° to about 200° C.

7. A process according to claim 5 wherein step (B) is performed at about 75° to about 125° C.

8. A process according to claim 5 wherein step (C) is performed at about 100° to about 200° C.

9. A process according to claim 5 wherein step (D) is performed at about 600° to about 700° C.

10. A process according to claim 2 wherein said metallic oxide is $Fe_2O_3$.

11. A process according to claim 1 wherein in steps (3) and (4) the amount of water is about 50 to about 400% by weight in excess of stoichiometric.

12. A process according to claim 1 wherein step (1) is performed at about 150° to about 250° C., step (2) is performed at about 500° to about 950° C., step (3) is performed at about 175° to about 350° C., step (4) is performed at about 0° to about 200° C., and step (5) is performed at at least about 500° C.

13. A process according to claim 12 wherein step (1) is performed at about 175° to about 225° C.

14. A process according to claim 12 wherein step (2) is performed at about 700° to about 800° C.

15. A process according to claim 12 wherein step (3) is performed at about 225° to about 275° C.

16. A process according to claim 12 wherein step (4) is performed at about 125° to about 175° C.

17. A process for decomposing water into hydrogen and oxygen comprising (1) reacting hydrogen sulfide with cuprous sulfide at a temperature of about 150° to about 250° C. to produce said hydrogen and cupric sulfide according to the equation $H_2S + Cu_2S \rightarrow H_2 + 2CuS$;

(2) decomposing at about 500° to about 950° C. to produce said cuprous sulfide and sulfur according to the equation $2CuS \rightarrow Cu_2S + S$;

(3) reacting said sulfur with water in the presence of an amount of water about 50 to about 400% by weight in excess of stoichiometric at about 150° to about 350° C. to produce hydrogen sulfide and sulfur dioxide according to the equation $3S + 2H_2O \rightarrow H_2S + SO_2$;

(4) reacting said sulfur dioxide with water in the presence of an amount of water about 50 to about 400% by weight in excess of stoichiometric at a temperature of about 0° to about 200° C. to produce sulfur and sulfuric acid according to the equation $3SO_2 + 2H_2O + S + 2H_2SO_4$; and (5) reacting in water a metallic oxide with said sulfuric acid an amount of said sulfuric acid about 50 to about 200% in excess of stoichiometric at room temperature to about 300° C. to produce a solution of a metallic sulfate hydrate in water according to the equation $M_mO_n + nH_2SO_4 \rightarrow M_m(SO_4)_n \cdot nH_2O$ where M is Fe, Mn, Ni, Co, or V, and where m and n depend on the metallic oxide used;

(6) precipitating said metallic sulfate hydrate at about 50° to about 150° C. according to the equation $M_m(SO_4)_n \cdot nH_2O \rightarrow M_m(SO_4)_n \cdot nH_2O \downarrow$;

(7) decomposing said metallic sulfate hydrate at about 85° to about 400° C. into insoluble crystalline metallic sulfate and water according to the equation $M_m(SO_4)_n \cdot nH_2O \rightarrow M_m(SO_4)_n + nH_2O$;

(8) decomposing said crystalline metallic sulfate at about 500° to about 700° C. to produce said metallic oxide, oxygen, and said sulfur dioxide according to the equation $2M_m(SO_4)_n \rightarrow 2M_mO_n + 2SO_2 + O_2$.

18. A process according to claim 17 wherein step (1) is performed at about 150° to about 250° C., step (2) at about 500° to about 950° C., step (3) at about 225° to about 275° C., step (4) at about 125° to about 175° C., step (5) at about 175° to about 200° C., step (6) at about 75° C. to about 125° C., step (7) at about 100° C. to about 200° C., and step (8) at about 600° to about 700° C.

19. A process according to claim 17 wherein said metallic oxide is $Fe_2O_3$.

* * * * *